United States Patent [19]

Keogh

[11] Patent Number: 4,579,913

[45] Date of Patent: * Apr. 1, 1986

[54] COMPOSITION OF A RELATIVELY STABLE POLYMER OF AN OLEFINIC MONOMER AND AN UNSATURATED SILANE, AND AN ORGANO TITANATE

[75] Inventor: Michael J. Keogh, Bridgewater, N.J.

[73] Assignee: Union Carbide Corporation, Danbury, Conn.

[ * ] Notice: The portion of the term of this patent subsequent to Jul. 2, 2002 has been disclaimed.

[21] Appl. No.: 669,754

[22] Filed: Nov. 9, 1984

Related U.S. Application Data

[63] Continuation-in-part of Ser. No. 534,354, Sep. 23, 1983, Pat. No. 4,526,930.

[51] Int. Cl.$^4$ .................... C08L 23/26; C08L 43/04
[52] U.S. Cl. ................ 525/326.5; 525/370; 524/547
[58] Field of Search ............ 525/288, 370, 326.5

[56] References Cited

U.S. PATENT DOCUMENTS

| | | | |
|---|---|---|---|
| 3,225,108 | 12/1965 | Zutty | 526/209 |
| 3,392,156 | 7/1968 | Donaldson | 526/227 |
| 3,646,155 | 2/1972 | Scott | 525/288 |
| 4,012,567 | 3/1977 | Loveless | 525/370 |
| 4,291,136 | 9/1981 | Keogh | 525/102 |
| 4,297,310 | 10/1981 | Akutsu et al. | 264/83 |
| 4,328,323 | 5/1982 | Keogh | 525/106 |
| 4,351,876 | 9/1982 | Doi et al. | 428/349 |
| 4,397,981 | 8/1983 | Doi et al. | 524/465 |
| 4,412,042 | 10/1983 | Matsuura et al. | 525/288 |
| 4,413,066 | 11/1983 | Isaka et al. | 521/149 |
| 4,446,283 | 5/1984 | Doi et al. | 525/344 |

FOREIGN PATENT DOCUMENTS 714629 7/1965 Canada .
2101138 1/1983 United Kingdom .

Primary Examiner—Wilbert J. Briggs, Sr.
Attorney, Agent, or Firm—James C. Arvantes; Robert C. Brown

[57] ABSTRACT

Compositions of relatively stable polymers of an olefinic monomer and an unsaturated silane; and an organo titanate, wherein a readily hydrolyzable group of the titanate ester exchanges with one ester group of the silane moieties of the stable polymers to provide readily water-curable polymers which are useful as extrudates about wires and cables.

12 Claims, No Drawings

COMPOSITION OF A RELATIVELY STABLE POLYMER OF AN OLEFINIC MONOMER AND AN UNSATURATED SILANE, AND AN ORGANO TITANATE

This application is a continuation-in-part of my copending application Ser. No. 534,354 filed Sept. 23, 1983, now U.S. Pat. No. 4,526,930.

SUMMARY OF THE INVENTION

This invention relates to compositions of relatively stable polymers of an olefinic monomer and an unsaturated silane; and an organo titanate, wherein a readily hydrolyzable group of the titanate ester exchanges with an ester group of the silane moieties of the stable polymers to provide readily water-curable polymers. The readily water-curable polymers are particularly useful as extrudates about wires and cables.

Currently, two major processes, so-called peroxide-curing and water-curing, are being employed in the application of protective coatings such as insulation and jacketing about wires and cables. The peroxide-curing process involves extruding compositions containing an organic peroxide about wires and cables and subjecting the resultant articles to elevated temperatures in order to cure the compositions to crosslinked products. The overall operation requires careful control of the process parameters in order to avoid undue heat and pressure build-up in the extruder. Undue heat and pressure build-up results in premature decomposition of the peroxides which in turn results in crosslinking of the compositions in the extruder. Crosslinking of the compositions in the extruder, commonly referred to as "scorch" necessitates, in extreme cases, stopping the operation and cleaning the extruder. In situations wherein "scorch" occurs but is not as severe, it has been found that the work-life of the ultimate coatings is relatively short. In addition to the processing difficulties of peroxide-curing, the peroxide containing compositions do not have that degree of resistivity to deformation, at normal peroxide loadings, demanded by many ultimate users of insulated and jacketed wire and cable articles.

The water-curing process, on the other hand, involves compositions containing hydrolyzable, silane modified thermoplastic polymers and is more commercially attractive in that a wider latitude in the processing conditions is possible. That is, compositions containing water-curable, silane modified polymers can be extruded at temperatures far in excess of maximum processing temperatures used in extruding peroxide containing compositions. Being capable of extrusion at higher temperatures, such compositions can be extruded at faster rates and under lower pressure and consequently are more cost effective.

A disadvantage with respect to the so-called water-curing process, however, is the water sensitivity of the compositions involved. Compositions containing water-curable, silane modified thermoplastic polymers tend to crosslink under normal conditions of handling and storage. As a result, the relatively poor shelf life of such compositions has limited the wide commercial acceptance of the water-curing process in the United States.

DETAILED DESCRIPTION OF THE INVENTION

According to the present invention, an olefinic monomer is reacted with an unsaturated, relatively water stable silane to produce a relatively water stable thermoplastic polymer having pendant silane moieties. The relatively water stable polymer is activated or made readily water-curable by the reaction therewith of an organo titanate having at least one readily hydrolyzable group which ester exchanges with an ester group of the silane moieties.

The relatively water stable polymers have pendant thereto silane moieties of the formula:

FORMULA I wherein R is a straight chain hydrocarbon radical having a minimum of 4 carbon atoms, generally having 4 to 18 carbon atoms inclusive or a branched chain hydrocarbon radical, which includes a hydrocarbon radical bonded to the oxygen atom through a non-terminal carbon atom, having a minimum of 3 carbon atoms, generally having 3 to 18 carbon atoms inclusive.

Illustrative of suitable straight chain hydrocarbon radicals for R are alkyl radicals such as n-butyl, n-hexyl, n-heptyl, n-nonyl, n-decyl, n-dodecyl, stearyl, myristyl and the like.

Illustrative of suitable branched chain hydrocarbon radicals for R are alkyl radicals such as isopropyl, sec-butyl, isobutyl, sec-amyl, isoamyl, 4-methyl-2-pentyl, 2-ethylhexyl and the like.

Each V, which can be the same or different, is a hydrocarbon radical having 1 to 18 carbon atoms inclusive or (—OR) wherein R is as previously defined.

Illustrative of suitable hydrocarbon radicals for each V are alkyl radicals having 1 to 18 carbon atoms inclusive, preferably 1 to 6 carbon atoms inclusive such as methyl, ethyl, n-propyl, isopropyl, n-butyl, n-hexyl and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl and the like.

Olefinic monomers, at least one of which is reacted with at least one silane, as defined below, to produce the relatively water stable polymers, contain at least one group of the formula

Among such monomers are monoolefins having the formula:

    Formula II wherein $\alpha$ has a value of at least 2. Exemplary of olefins falling within the scope of Formula II are: ethylene, propylene, butene-1, pentene-1, 4-methyl-pentene-1, hexene-1, heptene-1, octene-1 and the like. Diolefins having the formula:

    Formula III wherein $\beta$ has a value of at least 3. Exemplary of diolefins falling within the scope of Formula III are: 1,4-pentadiene, 1,3-hexadiene, 1,5-hexadiene, 1,4-octadiene, ethylidene norbornene and the like.

Illustrative of monomers which can be polymerized with monoolefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride; alkyl acrylates which fall within the scope of the following formula:

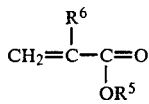

FORMULA IV wherein $R^6$ is hydrogen or methyl and $R^5$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

It is to be understood that mixtures of reactants can be polymerized to produce suitable polymers.

Silanes, suitable for reaction with the olefinic monomers previously described are vinyl silanes having the formula:

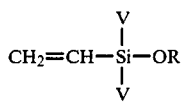

FORMULA V wherein R and V are as previously defined, such as vinyl-tris(isopropoxy) silane, vinyl-tris(n-butoxy) silane, vinyl-tris(sec-butoxy) silane, vinyl-tris(iso-butoxy) silane, vinyl-tris(n-pentoxy) silane, vinyl-tris(n-hexoxy) silane, vinyl-tris(2-ethylhexoxy-1) silane, vinyl-tris(n-heptoxy) silane, vinyl-tris(n-octoxy) silane, vinyl-tris(n-dodecyloxy) silane, vinyl-bis(n-butoxy)methyl silane, vinyl-bis(n-pentoxy)methyl silane, vinyl-bis(n-hexoxy)methyl silane, vinyl-(n-butoxy)dimethyl silane, vinyl(n-pentoxy)dimethyl silane and the like; unsaturated silanes having the formula:

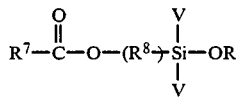

FORMULA VI wherein $R^7$ is an unsaturated hydrocarbon radical such as an alkylene radical having 2 to 18 carbon atoms inclusive, preferably 2 to 4 carbon atoms inclusive such as ethylene, propylene and the like, and R and each V are as previously defined.

Illustrative of suitable radicals for $R^8$ are alkylene radicals having 1 to 18 carbon atoms inclusive, preferably 1 to 6 carbon atoms inclusive, such as methylene, ethylene, propylene, butylene, hexylene and the like; alkoxy radicals having 1 to 18 carbon atoms inclusive, preferably 1 to 6 carbon atoms inclusive such as methyloxymethyl, methyloxypropyl, ethyloxyethyl, ethyloxypropyl, propyloxypropyl, propyloxybutyl, propyloxyhexyl and the like.

Exemplary of suitable silanes falling within the scope of Formula VI are the following:

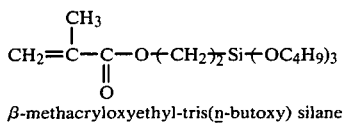

β-methacryloxyethyl-tris(n-butoxy) silane

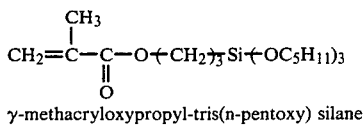

γ-methacryloxypropyl-tris(n-pentoxy) silane

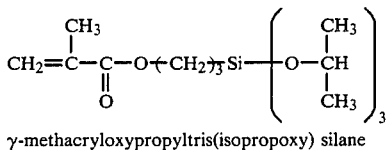

γ-methacryloxypropyltris(isopropoxy) silane

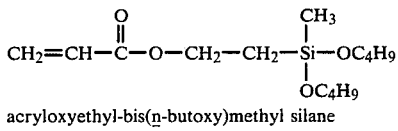

acryloxyethyl-bis(n-butoxy)methyl silane

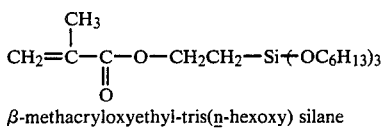

β-methacryloxyethyl-tris(n-hexoxy) silane

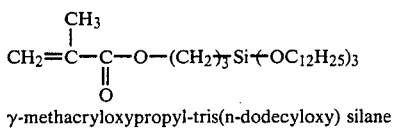

γ-methacryloxypropyl-tris(n-dodecyloxy) silane

Organo titanates, suitable for purposes of this invention, have the formula:

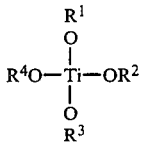

FORMULA VII wherein $R^1$ is methyl, ethyl or propyl and $R^2$, $R^3$ and $R^4$, which can be the same or different, are hydrocarbon radicals having 1 to 18 carbon atoms inclusive, preferably 1 to 4 carbon atoms inclusive.

Exemplary of suitable hydrocarbon radicals for $R^2$, $R^3$ and $R^4$ are alkyl radicals such as methyl, ethyl, n-propyl, isopropyl, butyl, octyl, lauryl, myristyl, stearyl and the like; cycloaliphatic radicals such as cyclohexyl and the like; aryl radicals such as phenyl, methylphenyl and the like; alkaryl radicals such as benzyl and the like.

The reaction of an olefinic monomer and a silane can be carried out by methods well known in the art, as described in detail in U.S. Pat. No. 3,225,018, granted on Dec. 21, 1965 in the name of Nathan L. Zutty.

Reaction of relatively water stable polymers having pendant silane moieties, as described, with an organo titanate can be conveniently carried out in an apparatus in which the polymer is subjected to mechanical working such as a Banbury mixer, a Brabender mixer or an extruder.

The amount of organo titanate admixed with the silane modified polymer is sufficient to ester exchange at least one ester group of the titanate for one ester group of the silane moiety. Generally, the amount used is about 0.1 to about 20 percent by weight, preferably about 0.5 to about 5 percent by weight, based on the weight of the silane modified polymer.

The temperature at which this reaction is carried out is not critical and can vary, conveniently, from about 80° C. to about 300° C., and preferably from about 150° C. to about 230° C.

The reaction can be carried out at atmospheric, subatmospheric or superatmospheric pressure, although superatmospheric pressure is preferred, generally up to about 10,000 psi.

Recovery of the silane modified polymer is effected by allowing the contents of the reaction flask to cool and discharging into a suitable receiver for storage, preferably under an inert gas blanket.

The curing or crosslinking of the resultant silane modified polymer is effected by exposing the polymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at significant rates in the absence of added silanol condensation catalyst. The organo titanate reactant present in the production of the silane modified polymers also catalyzes the crosslinking reaction.

Alternatively, a wide variety of materials which function as silanol condensation catalysts and which are known in the art can be employed in the crosslinking process. Such materials include metal carboxylates described in U.S. Pat. No. 4,328,323 and include dibutyltin dilaurate and the like.

To the silane modified polymers of this invention may be added various additives, in amounts well known in the art, such as fillers among which can be mentioned carbon black, clay, talc (magnesium silicate), calcium carbonate, silica, aluminum hydroxide and the like.

The silane modified polymers can be rendered flame retardant by the addition thereto of halogen containing flame retardants such as decabromodiphenyl oxide, chlorinated polyethylene, polyvinyl chloride and halogenated paraffin waxes, alone or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosures of all patents and applications noted are incorporated herein by reference. Also, mixtures of materials can be used in carrying out this invention.

The following example could serve to illustrate the present invention.

EXAMPLE 1

(A)—Ethylene-vinyl-tris(iso-butoxy) silane copolymer

This copolymer could be prepared as follows: into an autoclave of 1.5 liter capacity, there is charged ethylene, at a rate of 43 kilograms per hour, vinyl-tris(iso-butoxy) silane, at the rate of 50 grams per hour, propylene (chain transfer agent), at the rate of 600 liters per hour and t-butylperoxyisobutyrate (initiator), at a rate of 1.9 grams per hour. During the reaction, the pressure is maintained at 2400 Kg/cm$^2$ and the temperature is maintained at 220° C. Under these conditions, it is expected that the resultant ethylene-vinyl-tris(iso-butoxy) silane copolymer would have a melt flow rate in the range of 2 to 8 grams/10 min. and a silane content of 0.2 percent by weight.

(B)—Activated ethylene-vinyl-tris(iso-butoxy) silane copolymer

The copolymer of (A) could be activated, that is, ester exchanged as follows: the copolymer of (A) is charged into a Brabender mixer and fluxed to a temperature of 130° C. while under an argon gas atmosphere. To the fluxed copolymer is then added tetramethyl titanate in an amount of 0.5 percent by weight, based on the weight of the copolymer. The contents of the Brabender mixer are brought, rapidly, to a temperature of 200° C. by increasing the mixing rate, maintained at this temperature for 3 minutes and then discharged into an inert atmosphere.

Copolymer (A) and activated Copolymer (B), unmodified and modified by the addition of dibutyltin dilaurate can be formed into standard test plaques, 3 inches by 3 inches by 0.0075 inch. On curing the test plaques by placing them in a 70° C. water bath for one hour and then testing by the Monsanto Rheometer test described in detail in U.S. Pat. No. 4,018,852, patented Apr. 19, 1977, it is to be expected that the relative levels of final cure would be as indicated in Table I.

TABLE I

|  | Percent of Final Cure |
|---|---|
| Copolymer (A) | 0–5 |
| Copolymer (A) modified with 0.005 percent by weight dibutyltin dilaurate | <10 |
| Copolymer (B) | >70 |
| Copolymer (B) modified with 0.005 percent by weight dibutyltin dilaurate | >70 |

What is claimed is:

1. A composition of matter comprising a preformed thermoplastic polymer of at least one olefinic monomer and at least one unsaturated silane, said polymer having pendant silane moieties of the formula:

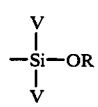

wherein R is a straight chain hydrocarbon radical having a minimum of 4 carbon atoms, a branched chain hydrocarbon radical or a hydrocarbon radical bonded to the oxygen atom through a non-terminal carbon atom, having a minimum of 3 carbon atoms, each V is a hydrocarbon radical having 1 to 18 carbon atoms inclusive or an —OR radical wherein R is as previously defined; and an organo titanate of the formula:

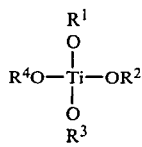

wherein $R^1$ is methyl, ethyl or propyl and $R^2$, $R^3$ and $R^4$ are hydrocarbon radicals having 1 to 18 carbon atoms inclusive; wherein said organo titanate is present in an amount sufficient to ester exchange at least one ester group of the titanate for one ester group of the silane moieties.

2. A composition of matter as defined in claim 1 wherein said organo titanate is present in an amount of about 0.1 to about 20 percent by weight based on the weight of said polymer.

3. A composition of matter as defined in claim 1 wherein said organo titanate is present in an amount of about 0.5 to about 5 percent by weight based on the weight of said polymer.

4. A composition of matter as defined in claim 1 wherein the olefinic monomer is ethylene.

5. A composition of matter as defined in claim 1 wherein the olefinic monomer is a mixture of ethylene and ethyl acrylate.

6. A composition of matter as defined in claim 1 wherein the organo titanate is tetramethyl titanate or tetraethyl titanate.

7. A composition of matter as defined in claim 1 wherein the unsaturated silane is vinyl-tris(iso-butoxy) silane, vinyl-tris(2-ethylhexoxy) silane or vinyl-tris(iso-propoxy) silane.

8. A composition of matter as defined in claim 1 wherein the organo titanate is tetramethyl titanate or tetraethyl titanate and the unsaturated silane is vinyl-tris(iso-butoxy) silane, vinyl-tris(2-ethylhexoxy) silane or vinyl-tris(iso-propoxy) silane.

9. A composition of matter as defined in claim 1 wherein the olefin is ethylene and the unsaturated silane is vinyl-tris(iso-butoxy) silane.

10. A composition of matter as defined in claim 1 wherein the olefin is ethylene and the unsaturated silane is a γ-methacryloxypropyltrialkoxy silane.

11. A composition of matter comprising a preformed thermoplastic polymer of at least one olefinic monomer and at least one unsaturated silane, said polymer having pendant silane moieties of the formula:

wherein R is a straight chain hydrocarbon radical having 4 to 18 carbon atoms inclusive, a branched chain hydrocarbon radical or a hydrocarbon radical bonded to the oxygen atom through a non-terminal carbon atom, having 3 to 18 carbon atoms inclusive, each V is a hydrocarbon radical having 1 to 18 carbon atoms inclusive or an —OR radical wherein R is as previously defined; and an organo titanate of the formula:

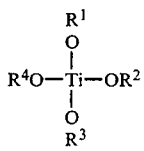

wherein $R^1$ is methyl, ethyl or propyl and $R^2$, $R^3$ and $R^4$ are hydrocarbon radicals having 1 to 4 carbon atoms inclusive; wherein said organo titanate is present in at least an amount sufficient to ester exchange one ester group of the titanate for one ester group of the silane moieties.

12. A composition as defined in claim 1 wherein the unsaturated silane is a γ-methacryloxypropyltrialkoxy silane.

* * * * *